United States Patent Office 2,949,439
Patented Aug. 16, 1960

2,949,439

VINYL CHLORIDE RESINS STABILIZED WITH BORIC ACID-POLYHYDRIC ALCOHOL REACTION PRODUCTS

Charles H. Fuchsman, University Heights, Baruch Zaremsky, South Euclid, and Floyd R. Hansen, Bedford, Ohio, assignors to Ferro Corporation, Cleveland, Ohio, a corporation of Ohio No Drawing. Filed Sept. 20, 1957, Ser. No. 685,090

6 Claims. (Cl. 260—45.95)

This invention relates to new compositions of matter and has more particular reference to stabilizers for halogen containing polymeric compounds.

In general, halogen containing polymeric compounds such as polyvinyl chloride, or copolymers of polyvinyl chloride and polyvinyl acetate or polyvinyl chloride and polyvinylidene chloride have very poor resistance to the effects of heat. It is well known to those skilled in the art that severe exposure, of the halogen containing vinyl resins, to heat brings about discoloration, brittleness and loss of strength. This degradation is especially pronounced during the various fabrication processes such as injection molding, calendering, etc.; operations which require heating of the plastic compositions.

Many additives have been used to delay or counteract these undesirable effects. Such additives, known in the art as stabilizers, have varying degrees of utility depending on the particular type of formulations used.

We have found that certain types of resin formulations, particularly those containing large quantities of solid filler material, are often more difficult to stabilize than formulations having small quantities of filler material. This is particularly true of some polyvinyl chloride flooring materials.

It is, therefore, the principal object of the present invention to provide stabilizers for halogen containing polymeric resin formulations containing a large amount of solid filler material.

A further object of this invention is to provide stabilizing agents which are economical, odor free and easy to incorporate into the halogen containing resins.

A still further object of this invention is to produce a stabilizer of low lubricity.

Other objects will become apparent as the description proceeds.

To the accomplishment of the foregoing and related ends, the invention then, comprises the features hereinafter fully described and particularly pointed out in the claims, the following description setting forth in detail certain illustrative embodiments of the invention, these being indicative, however, of but a few of the ways in which the principle of the invention, may be employed.

Broadly stated this invention comprises a composition of matter comprising a halogenated vinyl resin and a stabilizer, said stabilizer comprising a borate ester of polyhydric alcohols, said alcohols having not more than nine hydroxyl groups, a boiling point not less than 250° F. and at least one of said hydroxyl groups being a primary hydroxyl group, said ester having at least one free acidic hydrogen per boron atom.

From the foregoing broad statement it will be readily seen that the stabilizers of this invention are esters and not mere admixtures of polyhydric alcohol and boric acid. We have found that the borate esters of polyhydric alcohols are excellent stabilizers and are far superior in stabilizing properties to unreacted mixtures of boric acid and polyhydric alcohols.

The polyhydric compounds which have been found particularly useful in this invention are given in the following table:

I

Pentaerythritol
Glycol
Sorbitol
Propylene glycol
Polyethylene glycol
Trimethylolpropane
Glyceryl mono-stearate
Glyceryl mono-oleate
Glycerol
Dipentaerythritol
Trimethylolethane It will be understood that any polyhydric alcohol having not more than nine hydroxyl groups, at least one of which is a primary hydroxyl group and a boiling point not less than 250° F. is applicable to the present stabilizers. In producing the esters of the present invention the molar ratio of boric acid to polyhydric alcohol in the reaction mixture may be greatly varied. For example, the reaction mixtures used to produce the esters of the present invention could range from 1 mole of polyhydric alcohol to 8 moles of boric acid to 1 mole to boric to 8 moles of polyhydric alcohol. When glycerol is used, the ratio may vary from 1 mole of glycerol to 6 moles of boric acid, to 6 moles of glycerol to 1 mole of boric acid. It will be noted that these ratios can exceed the range of stoichiometric ratios of partial or total esterification. In practice it has been found possible to effect reaction at such extreme ratios, as evidenced by the removal of water in excess of that theoretically produced by esterification, and that in some applications, the compounds so produced are equal to, or superior to those represented by simple esterification. The additional water removed may be attributed to acid anhydride formation, or etherification of the alcohol (depending on which ingredient is present in quantities in excess of that needed for esterification). The mechanism of such a reaction is speculative, but the reaction has, in fact, been observed, and the reaction products used to advantage within the scope of the teachings of this invention. Preferred embodiments of the invention include 2-4 moles of boric acid per mole of polyhydric alcohol.

The esters of the present invention may be prepared by any suitable method. The simplest method we have found is by direct reaction without the use of any catalyst. While the melting points of boric acid and pentaerythritol are relatively high (365° F. and 503.6° F. respectively) we have found that they form a series of low melting mixtures, such that for a wide range of compositions the mixture is liquid at 150° F. to 300° F. When heating this mixture with stirring it is possible to drive off water readily at temperatures less than 300° F.

The degree of esterification is increased by raising the temperature or allowing longer reaction times and can easily be estimated by condensing and measuring the water driven off from the reaction mixture. We have found that removal of at least one mole of water per mole of polyhydric alcohol or boric acid (whichever is present in the smallest molar concentration) is required to give good performance.

The greater the degree of esterification, the higher is the melting point of the finished material. It is possible to continue heating long enough to cause the liquid phase to disappear. But it is generally more convenient to discontinue heating as soon as the desired amount of water removal has been accomplished. The resulting products are usually liquid at the reaction temperature.

So that the stabilizing effect of the borate esters of the polyhydric alcohols are more readily understood the following examples are given:

*Example I*

200 parts polyvinyl chloride-polyvinyl acetate copolymer
200 parts asbestos
100 parts calcium carbonate
10 parts titanium dioxide
35 parts di-2-ethyl hexyl phthalate
5 parts epoxidized soya bean oil This mixture was milled for 10 minutes at 230° F. When taken off the mill the color of the sheet was gray. The vinyl sheet was then heated in a forced circulating hot air oven at 325° F., the material turned brown in less than 15 minutes.

*Example II*

In a mixture as in Example I above 2 parts of borate ester of a polyhydric alcohol was used to stabilize the mixture. This ester was made from a pentaerythritol boric acid mixture whose molar ratio was 1:2 respectively and from which 3.5 moles of water were removed per mole of pentaerythritol. This mixture was milled as above for 10 minutes at 230° F. and the formed sheet was gray in color as in the above example. When placed in the oven at 325° F. the original gray color was retained virtually unchanged for 45 minutes, and was very light grayish-tan after two hours. Thus the effectiveness of the borate ester stabilizer is clearly demonstrated.

*Example III*

A mixture was prepared as in Example II except that the borate ester was an ester of glycerol. In this case the molar ratio of the boric acid to glycerol was 4:1 and 3.3 moles of water were removed per mole of glycerol. After milling and subjecting the sheet to heating at 325° F. the original gray color was substantially unchanged after 2 hours.

*Example IV*

The mixture as in Example II was used except that a different ester was used as a stabilizer. In this case a reaction mixture containing pentaerythritol to boric acid ratio of 1:1 was used. In forming the ester approximately 3.5 moles of water were removed. Upon heating at 325° F. the sheet formed from the milling operation darkened only very slightly after 45 minutes.

*Example V*

The mixture as in Example II was used except that the pentaerythritol and boric acid were added without prior reaction to form the ester. The mixture when subjected to the oven at 325° F. became brown after 15 minutes, illustrating the necessity for using the ester rather than the acid and alcohol simply admixed.

*Example VI*

When a 45% solution of sorbitol in the inert solvent, dimethyl sulfoxide, was reacted with solid boric acid, in the ratio of one mole of sorbitol to 2 moles of boric acid, 2 moles of water were removed. The maximum reaction temperature was 302° F. The resulting dimethyl sulfoxide solution of the sorbitol borate ester, when added to the mixture of Example I, at a concentration of 6 parts per 100 parts of resin gave only slight discoloration in the oven after 75 minutes at 325° F.

The composition of the mixture given in Example I is typical of that used in the tests. But other compositions are suitable, and the above-mentioned borate esters have demonstrated useful stabilizing properties with varying compositions.

Thus, the polymer may also be polyvinyl chloride, containing no polyvinyl acetate. The asbestos may be increased to as much as 400 parts per 100 parts of resin or completely omitted, or any intermediate concentration chosen. Similarly the calcium carbonate may be varied between 0 and 400 parts per 100 parts of resin. Other fillers such as clay, gypsum or anhydrite may be used to replace all or part of the above-mentioned fillers within the concentration ranges noted. Titanium dioxide may be increased, or omitted, or replaced by any other suitable pigment. The plasticizer may be either or both of the items listed (di-2-ethyl hexyl phthalate, epoxidized soya bean oil) or any other commercial type of plasticizer.

We have also discovered that the borate esters of polyhydric alcohols may be used as single stabilizers or may be used in combination with many other familiar types of stabilizers to increase the effectiveness of such other stabilizers. Such materials as barium, cadmium, zinc, tin, calcium and strontium oxides, hydroxides and the corresponding salts of inorganic acids or organic acids, phenolates and alcoholates may be used with the stabilizers of the present invention. Additionally, superior stabilization may be obtained when the borate esters of the present invention are used in conjunction with organic phosphites such as triphenyl phosphite, tri-2-ethyl hexyl phosphite, and mixed aryl alkyl phosphite esters.

While as previously stated the borate esters of polyhydric alcohols are particularly useful in stabilizing compositions containing a high percentage of filler, they may also be used advantageously in compositions containing little or no filler. The present stabilizers can be used in concentrations from about 0.1 part to about 10 parts per 100 parts of resin.

Other modes of applying the principle of the invention may be employed, change being made as regards the details described, provided the features stated in any of the following claims or the equivalent of such be employed.

We, therefore, particularly point out and distinctly claim as our invention:

1. A composition of matter comprising a chlorine containing vinyl resin selected from the group consisting of polyvinyl chloride, vinylchloride-vinylacetate copolymers, and vinylchloride-vinylidene chloride copolymers and from about 0.1 to about 10 parts per 100 parts of said resin of a stabilizer, said stabilizer comprising a borate ester of a polyhydric alcohol, said alcohol containing from 1 to 8 hydroxyl groups and a primary hydroxyl group, said ester having from 1 to 2 free acidic hydrogens per atom of boron and the mole ratio of polyhydric alcohol to boric acid being in the range from 1:8 to 8:1.

2. A composition of matter comprising a chlorine containing vinyl resin selected from the group consisting of polyvinyl chloride, vinylchloride-vinylacetate copolymers, and vinylchloride-vinylidene chloride copolymers and from about 0.1 part to about 10 parts per 100 parts of resin of a stabilizer, said stabilizer comprising pentaerythritol borate, said ester having from 1 to 2 free acidic hydrogens per atom of boron and the mole ratio of polyhydric alcohol to boric acid being in the range from 1:8 to 8:1.

3. A composition of matter comprising a chlorine containing vinyl resin selected from the group consisting of polyvinyl chloride, vinylchloride-vinylacetate copolymers, and vinylchloride-vinylidene chloride copolymers and from about 0.1 part to about 10 parts per 100 parts of resin of a stabilizer, said stabilizer comprising propylene glycol borate, said ester having from 1 to 2 free acidic hydrogens per atom of boron and the mole ratio of polyhydric alcohol to boric acid being in the range from 1:8 to 8:1.

4. A composition of matter comprising a chlorine containing vinyl resin selected from the group consisting of polyvinyl chloride, vinylchloride-vinylacetate copolymers, and vinylchloride-vinylidene chloride copolymers and from about 0.1 part to about 10 parts per 100 parts of resin of a stabilizer, said stabilizer comprising sorbitol borate, said ester having from 1 to 2 free acidic hydrogens per atom of boron and the mole ratio of polyhydric alcohol to boric acid being in the range from 1:8 to 8:1.

5. A composition of matter comprising a chlorine containing vinyl resin selected from the group consisting of polyvinyl chloride, vinylchloride-vinylacetate copolymers, and vinylchloride-vinylidene chloride copolymers and from about 0.1 part to about 10 parts per 100 parts of resin of a stabilizer, said stabilizer comprising glycerol borate, said ester having from 1 to 2 free acidic hydrogens per atom of boron and the mole ratio of polyhydric alcohol to boric acid being in the range from 1:8 to 8:1.

6. A composition of matter comprising a chlorine containing vinyl resin selected from the group consisting of polyvinyl chloride, vinylchloride-vinylacetate copolymers, and vinylchloride-vinylidene chloride copolymers and from about 0.1 part to about 10 parts per 100 parts of resin of a stabilizer, said stabilizer comprising trimethylolethane borate, said ester having from 1 to 2 free acidic hydrogens per atom of boron and the mole ratio of polyhydric alcohol to boric acid being in the range from 1:8 to 8:1.

References Cited in the file of this patent

UNITED STATES PATENTS

| | | |
|---|---|---|
| 2,515,686 | Barnes et al. | July 18, 1950 |
| 2,617,783 | Slocombe et al. | Nov. 11, 1952 |
| 2,712,996 | Elliott | July 12, 1955 |